United States Patent
Struyk

(10) Patent No.: US 7,791,686 B2
(45) Date of Patent: Sep. 7, 2010

(54) LCD-BASED CONFIDENTIAL VIEWING APPARATUS UTILIZING AUTO-INVERSION MASKING

(75) Inventor: David A Struyk, Deephaven, MN (US)

(73) Assignee: WaterStrike Incorporated, Excelsior, MN (US)

( * ) Notice: Subject to any disclaimer, the term of this patent is extended or adjusted under 35 U.S.C. 154(b) by 576 days.

(21) Appl. No.: 11/473,592

(22) Filed: Jun. 23, 2006

(65) Prior Publication Data

US 2007/0296889 A1    Dec. 27, 2007

(51) Int. Cl.
*G02F 1/1335*    (2006.01)
*G02F 1/1347*    (2006.01)

(52) U.S. Cl. .......................................... 349/74; 349/15
(58) Field of Classification Search .................. 349/15, 349/73–74
See application file for complete search history.

(56) References Cited

U.S. PATENT DOCUMENTS

| | | | |
|---|---|---|---|
| 4,602,285 A | 7/1986 | Beaulier et al. | |
| 4,879,603 A | 11/1989 | Berman | |
| 5,028,994 A | 7/1991 | Miyakawa et al. | |
| 5,113,285 A | 5/1992 | Franklin et al. | |
| 5,327,285 A | 7/1994 | Faris | |
| 5,406,627 A | 4/1995 | Thompson et al. | |
| 5,481,275 A | 1/1996 | Mical et al. | |
| 5,488,496 A | 1/1996 | Pine | |
| 5,500,686 A | 3/1996 | Yamaguchi et al. | |
| 5,537,144 A | 7/1996 | Faris | |
| 5,537,476 A | 7/1996 | Coteus et al. | |
| 5,614,920 A * | 3/1997 | Coteus et al. | ................. 345/7 |
| 5,619,219 A | 4/1997 | Coteus et al. | |
| 5,629,984 A | 5/1997 | McManis | |

(Continued)

FOREIGN PATENT DOCUMENTS

JP    01032332    2/1989

(Continued)

OTHER PUBLICATIONS

Ohtake and Aoki, A Study of Security for CRT Display with Liquid Crystal Shutter, The Transactions of the Institute of Electronics. Information and Communication Engineers, Apr. 25, 1990, pp. 453-455. vol. 373-D-I No. 4, Japan.

(Continued)

*Primary Examiner*—David Nelms
*Assistant Examiner*—Jessica M Merlin
(74) *Attorney, Agent, or Firm*—Schroeder & Siegfried, P.A.

(57) ABSTRACT

A display apparatus having a pair of polarizers with an optical rotator therebetween, one of the polarizers being a variable polarizer which is independently operated to alternate between substantially orthogonal states of polarization and cause the display to rapidly alternate between a normal positive and inverted negative image, creating a combined neutral image that in indecipherable to the naked eye. Shutter eyewear synchronized with the variable polarizer is used to extract the positive image for viewing by an intended viewer. In another embodiment, both polarizers of the display apparatus are independently variable, which allows for viewing of the desired image using passive polarized eyewear or eyewear incorporating synchronized variable polarizing rotators. Faster independent operation of the variable polarizers provide for flicker-free viewing of the desired image and convenient switching between normal and secure modes of operation, without physical alteration of the display.

12 Claims, 5 Drawing Sheets

U.S. PATENT DOCUMENTS

| | | | |
|---|---|---|---|
| 5,680,233 | A | 10/1997 | Faris et al. |
| 5,684,561 | A | 11/1997 | Yancey |
| 5,686,975 | A * | 11/1997 | Lipton .......................... 349/15 |
| 5,706,416 | A | 1/1998 | Mann et al. |
| 5,710,839 | A | 1/1998 | Cok |
| 5,801,697 | A | 9/1998 | Parikh et al. |
| 5,828,793 | A | 10/1998 | Mann |
| 5,844,717 | A | 12/1998 | Faris |
| 5,963,371 | A | 10/1999 | Needham et al. |
| 5,969,850 | A * | 10/1999 | Harrold et al. .............. 359/320 |
| 6,002,518 | A | 12/1999 | Faris |
| 6,016,159 | A | 1/2000 | Faris |
| 6,198,532 | B1 | 3/2001 | Cabib et al. |
| 6,236,407 | B1 | 5/2001 | Leban et al. |
| 6,252,570 | B1 * | 6/2001 | Mangerson .................. 345/87 |
| 6,292,092 | B1 | 9/2001 | Chow et al. |
| 6,317,522 | B1 | 11/2001 | Rackett |
| 6,529,209 | B1 | 3/2003 | Dunn et al. |
| 6,608,652 | B1 | 8/2003 | Yamazaki et al. |
| 6,650,306 | B2 | 11/2003 | Yerazunis et al. |
| 6,662,128 | B2 | 12/2003 | Barbour et al. |
| 2003/0026449 | A1 | 2/2003 | Yerazunis et al. |
| 2003/0038838 | A1 | 2/2003 | Pollitt |
| 2003/0046537 | A1 | 3/2003 | Smith |
| 2003/0118183 | A1 | 6/2003 | Struyk |
| 2003/0128218 | A1 | 7/2003 | Struyk |
| 2004/0100598 | A1* | 5/2004 | Adachi et al. ............... 349/113 |
| 2007/0146578 | A1* | 6/2007 | Yabuta et al. ................. 349/96 |

FOREIGN PATENT DOCUMENTS

| | | |
|---|---|---|
| JP | 02116826 | 5/1990 |
| JP | 04107524 | 4/1992 |
| JP | 05119754 | 5/1993 |
| JP | 05173127 | 7/1993 |
| JP | 07084253 | 3/1995 |
| JP | 08313895 | 11/1996 |
| JP | 09037192 | 2/1997 |

OTHER PUBLICATIONS

Rogers, For Your Eyes Only, Computer Graphics World, Dec. 1998, pp. 16-17 Penwell Publish, U.S.

* cited by examiner

LCD-BASED CONFIDENTIAL VIEWING APPARATUS UTILIZING AUTO-INVERSION MASKING

BACKGROUND OF THE INVENTION

The present invention is related generally to the art of confidential viewing of display images. More particularly, the present invention is directed to confidential viewing of a fundamental display image on a liquid crystal display (LCD) by utilizing auto-inversion masking to mask or neutralize the fundamental image so as to render it indecipherable to the naked eye, whereby image decoding is available only to the intended viewer.

With the increasing use of video displays for a variety of systems, such as those used in desktop computers, laptop computers, televisions, and personal video entertainment systems, there exists an increasing need and desire to provide confidential viewing of these displays by only those who the displayed content is intended for, thus eliminating the possibility of unauthorized viewing.

Various devices have been introduced over the years to prevent unauthorized viewing of video displays. The simplest devices generally include a form of "anti-glare" privacy screen and/or hoods and shields. These devices are commonly found on desktop computer displays which are intended to restrict viewing to only those who are more or less directly in front of the display. While these are somewhat effective, they cannot prevent viewing by someone peering over ones shoulder, and thus are far from secure.

Other devices have been developed which seek to obscure the view of a fundamental image from an unintended viewer by introducing a "masking image." In some devices, the masking image is introduced as an obscuring secondary light source. In others, the masking image is spatially multiplexed in some manner with the fundamental image; and in still others, the masking image is alternately displayed with the fundamental image at the vertical synch rate of the display device. These later systems, however, are largely dependent on the speed or refresh rate of the display and, although can be used with an LCD, are generally better suited for use with faster conventional CRT displays. With typical LCD displays, the required display refresh rate to provide flicker free performance is simply too high.

The LCD, however, due to its flat screen, thin profile, high resolution, and low power consumption, has become the display of choice for use with most portable laptop computers, where incidentally, the need for confidential viewing is likely to be the greatest. In this regard, some devices more specific to the LCD have been introduced which seek to provide confidential viewing by removing the top polarizing layer of the LCD screen. This renders the display "invisible" except to those wearing polarized glasses. In one such device, as discussed in U.S. Pat. No. 6,650,306, modulation of the LCD's liquid crystal display cell is introduced as a means of enhancing security. The viewing means is then configured with a synchronous liquid crystal rotator to decode the intended image for viewing. Devices of this type, however, are generally incapable of being readily switched between "confidential" and "standard" viewing modes, and typically require specialized eyewear to be worn at all times.

Given the desire and need for a simple and effective means of display security, and the limitations of the prior art, it is apparent that a better means is needed for providing confidential viewing of a standard LCD, which can be readily switched between standard and confidential viewing modes and used in all applications of full color/full motion graphics and images.

It is believed that my LCD-based confidential viewing apparatus utilizing auto-inversion masking techniques described hereafter accomplishes this end while greatly enhancing the viewing security of video displays today.

SUMMARY OF INVENTION

In accordance with the present invention, an image display device, similar to a standard LCD, includes first and second polarizers between which an optical rotator, such as a liquid crystal cell, is disposed. In the present invention, however, one of the polarizers of the image display device is configured as a variable polarizer which is capable of rapidly alternating between inverted states of polarization. This variable polarizer may be of any configuration, but is contemplated herein as being composed of a fixed linear polarizing filter in combination with an optical rotator which is optimized for bi-state operation, such as a Pi cell.

In essence then, the resulting display configuration will be constructed with front and rear fixed linear polarization filters, as in a standard LCD, but includes a pair of liquid crystal optical rotators disposed between the front and rear polarization filters. In this manner, either the front or rear polarizer may be converted to the variable polarizer. One optical rotator receives the image signal to be displayed, while the second rotator is independently controlled by an inverse controller which rapidly rotates the polarized light passing therethrough between approximate orthogonal positions (i.e., 0 and 90 degrees). This effectively switches the display between "positive" and "negative" modes, causing the display to rapidly and automatically alternate between normal and inverted images. The resulting combined image will appear to the naked eye as a 50% gray, substantially featureless neutral image.

Shutter glasses, similar to those used in common 3D stereo viewing applications, may be used to extract the fundamental image from the combined. The glasses, synchronized with the inverting variable rotator, are configured so that their shutters are open only when the positive image is displayed, and closed when the negative inverted image is displayed. In this way, only the positive or fundamental image is viewed, and the negative or inverted image is blocked.

As an alternative embodiment, it is contemplated that both front and rear polarizers may be of the variable type, each being composed of a fixed linear polarizing filter in combination with an optical rotator, such as a liquid crystal cell. This may be accomplished by adding an additional optical rotator adjacent the outer surface of the front polarizer, facing the viewer. In this embodiment, the variable polarizers may be operated synchronously in or out of phase with one another, and extraction of the desired image may be accomplished with passive polarized eyewear. Optionally, the phase relationship between the variable polarizers may be varied periodically or randomly over time, in which case extraction of the desired image requires the use of synchronized variable polarizing eyewear.

Since these new variable polarizers can be independently operated at much faster speeds than the LCD display, flicker is substantially or completely eliminated. In addition, the original image data is unchanged; only the viewable image itself has been altered, so no additional image processing is necessary. This new display apparatus may be operated in either normal or secure modes, and is easily switched by keystrokes or mouse commands, without any physical alteration of the display required.

BRIEF DESCRIPTION OF THE DRAWINGS

These and other objects and advantages of the invention will more fully appear from the following description, made in connection with the accompanying drawings, wherein like reference characters refer to the same or similar parts throughout the several views, and in which.

DETAILED DESCRIPTION OF INVENTION

Virtually all common video displays, from color television and CRT displays, to LCD screens, plasma displays, etc., operate by repeatedly displaying successive image frames at a predetermined display frame refresh rate. Such display devices rely on persistence of vision in the human eye to combine the displayed image frames into a composite image for viewing. Similarly, prior confidential viewing devices have utilized a process of time multiplexing a masking image with a fundamental image alternately at the display's refresh rate to generate a composite image that is indecipherable to the naked eye. As previously discussed, however, such devices are better suited for faster operating CRT displays. With a typical LCD, the required display refresh rate to provide flicker free performance is simply too high.

Figure 1:
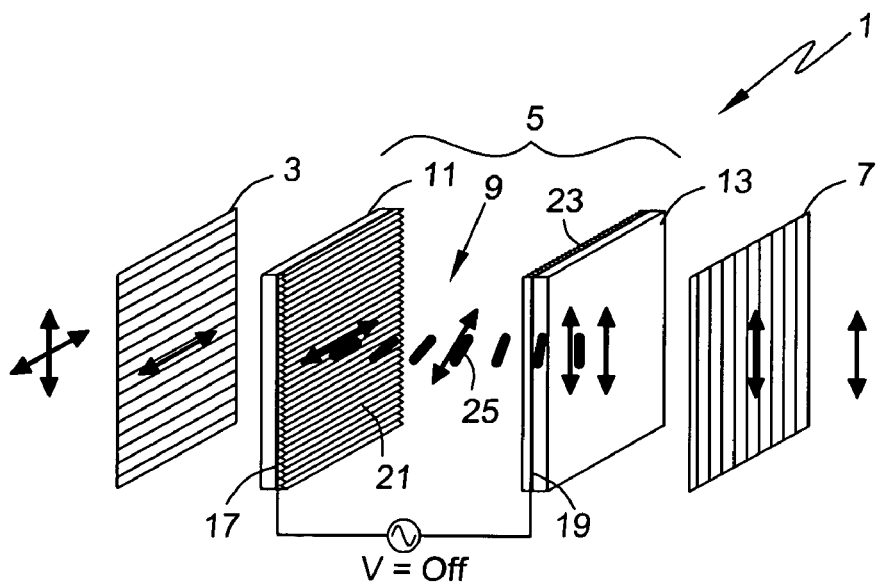
FIG. 1 is an exploded diagrammatical view of a typical prior art LCD cell, showing the various layers of construction for operation in a positive or "normally white" mode, absent an applied voltage to the liquid crystal layer.

Nearly all traditional LCD's are constructed in a similar manner. The various layers of an LCD are depicted in FIG. 1. An LCD 1 is generally composed of three (3) layers; a rear polarizer 3, an optical rotator 5, and a front polarizer 7. As shown, the polarizers 3 and 7 are most typically composed of linear polarizing light filters and, depending on the display's established mode of operation (i.e., "positive" or "negative"), may be polarized in parallel or orthogonal orientation relative to one another. For purposes of illustration only, the LCD shown in FIG. 1 is configured for operation in what is typically known in the art as the positive mode, or "normally white" display.

The optical rotator 5 is composed of a liquid crystal fluid layer 9 bound on both ends by specially coated glass substrates 11 and 13. The inside surfaces of the glass substrates 11 and 13 are first plated with a conductive layer of transparent indium tin oxide 17 and 19, respectively, and then coated with a polymeric compound. These coated layers 17 and 19 are then rubbed to provide microscopic grooves 21 and 23, which are aligned orthogonal to each other. Grooves 19 and 21 act to anchor the first adjacent layers of liquid crystal molecules 25, causing alignment therewith.

As shown in FIG. 1, the successive layers of liquid crystal molecules 25 twist in a chain-like manner to align with grooves 21 and 23 on the inner surfaces of substrates 11 and 13. As light enters the rear of the LCD cell, it passes through the rear linear polarizer 3. The linearly polarized light then enters the optical rotator cell 5, generally parallel to grooves 21 in substrate 11, and parallel to the director of adjacent liquid crystal molecules therein. As the polarized light progresses across cell 5, it rotates, following the twist pattern of liquid crystal molecules 25. As shown in FIG. 1, with no applied voltage across liquid crystal cell 5, the passing light will rotate to align with grooves 23 in substrate 13, thereby allowing passage through front linear polarizer 7, the polarization of which is in alignment with grooves 23, and orthogonal to rear polarizer 3.

Figure 2:
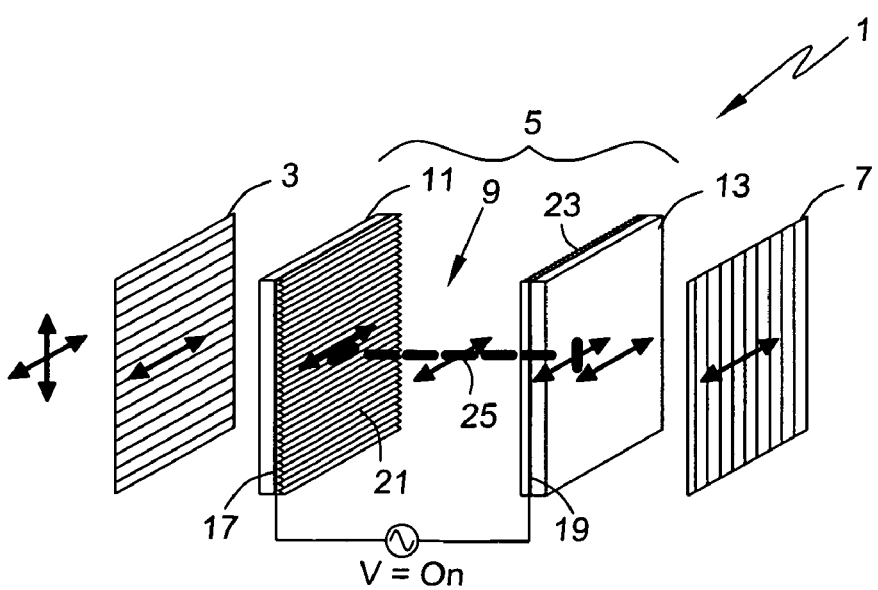
FIG. 2 is an exploded diagrammatical view of the prior art LCD cell shown in FIG. 1, showing the effect of an applied voltage to the liquid crystal layer.

The liquid crystal cell 5 rotates the polarized light in an amount inversely proportional to the applied voltage across the clear electrically conductive surfaces 17 and 19 applied to the insides of the glass substrates 11 and 13. As shown in FIG. 2, when the applied voltage is increased, the rod-like molecules 25 in the liquid crystal layer 9 begin to straighten, aligning themselves parallel to the applied field, and reducing the amount of optical rotation. The rotated light either passes through or is blocked by the front linear polarizer 7, depending on the amount of rotation which has taken place in the fluid layer 9. In most typical displays utilizing LCD technology, many small LCD cells may be combined as pixels to form a monochrome image. When color filters are added, subpixels are typically arranged in groups of three; red, green, and blue, to form the pixels of a color display.

By varying the applied voltage to the liquid crystal layer 5, the amount of light, and consequently the intensity of light, passing through each pixel or subpixel may be adjusted. If, for example, the polarization angle of the incident light is rotated approximately 90 degrees, the relative intensities of the individual red, green, and blue components will invert. Thus, if the intensity of red was 10%, it will now be 90%; if previously 50%, it will remain at 50%. This is supported by Malus's Law, which shows that the intensity of a beam of light passing through two linear polarizers is proportional to the angle θ of rotation between the two polarizers as:

$$I = I(0°)\cos^2\theta$$

Figure 3:
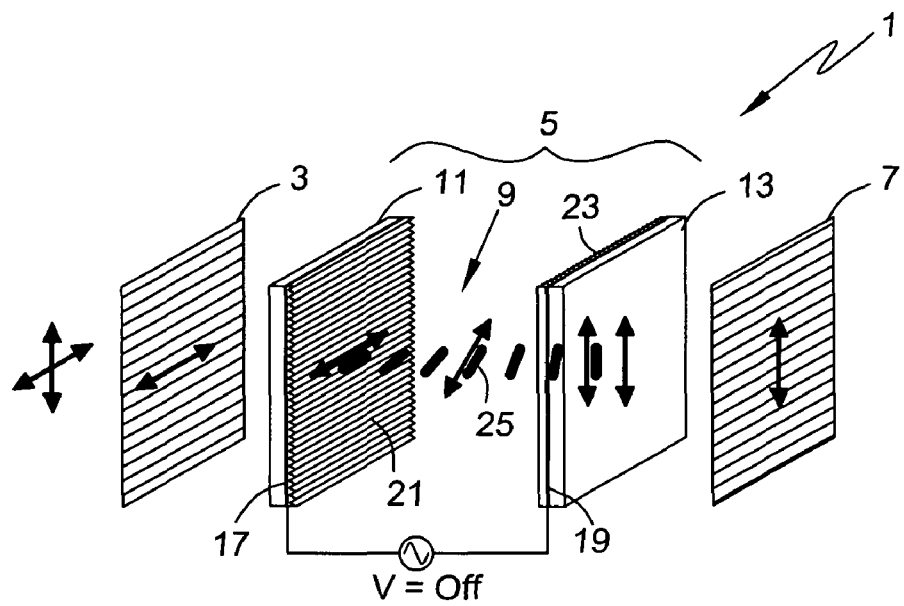
FIG. 3 is an exploded diagrammatical view of a typical prior art LCD cell, showing the various layers of construction for operation in a negative or "normally black" mode, absent an applied voltage to the liquid crystal layer.

It is important to point out that this function is symmetrical about 45 degrees. Therefore, if the polarization angle of the front linear polarizer 7 of a positive mode, or "normally white" display, is rotated approximately 90 degrees, the entire image will automatically invert. This is referred to as the negative mode, or "normally black" display, and is shown in FIG. 3. Displays are commonly used in either mode, but once the mode is set by the orientation between the front and rear polarizer, the mode of operation is set.

Figure 4:
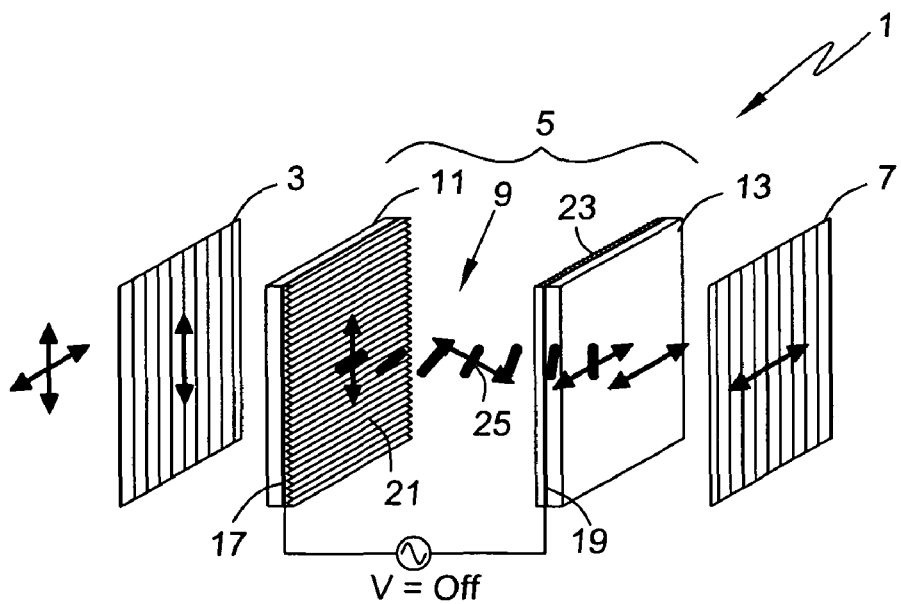
FIG. 4 is an exploded diagrammatical view of an alternative prior art construction for a LCD cell operating in a negative or "normally black" mode, showing the propagation of light through the liquid crystal layer orthogonal to the director of molecules therein.

Notably, it matters not which direction light enters liquid crystal cell 5, as it will still twist the light propagating therethrough in accordance with the above principles. Thus, although not commonly implemented, the rear polarizer 3 may also be installed at 90 degrees to the orientation of grooves 21, and therefore 90 degrees to the molecular director and not at the usual inline position. In this case, the light propagates through the liquid crystal at 90 degrees to the molecular director, as shown in FIG. 4.

Figure 5:
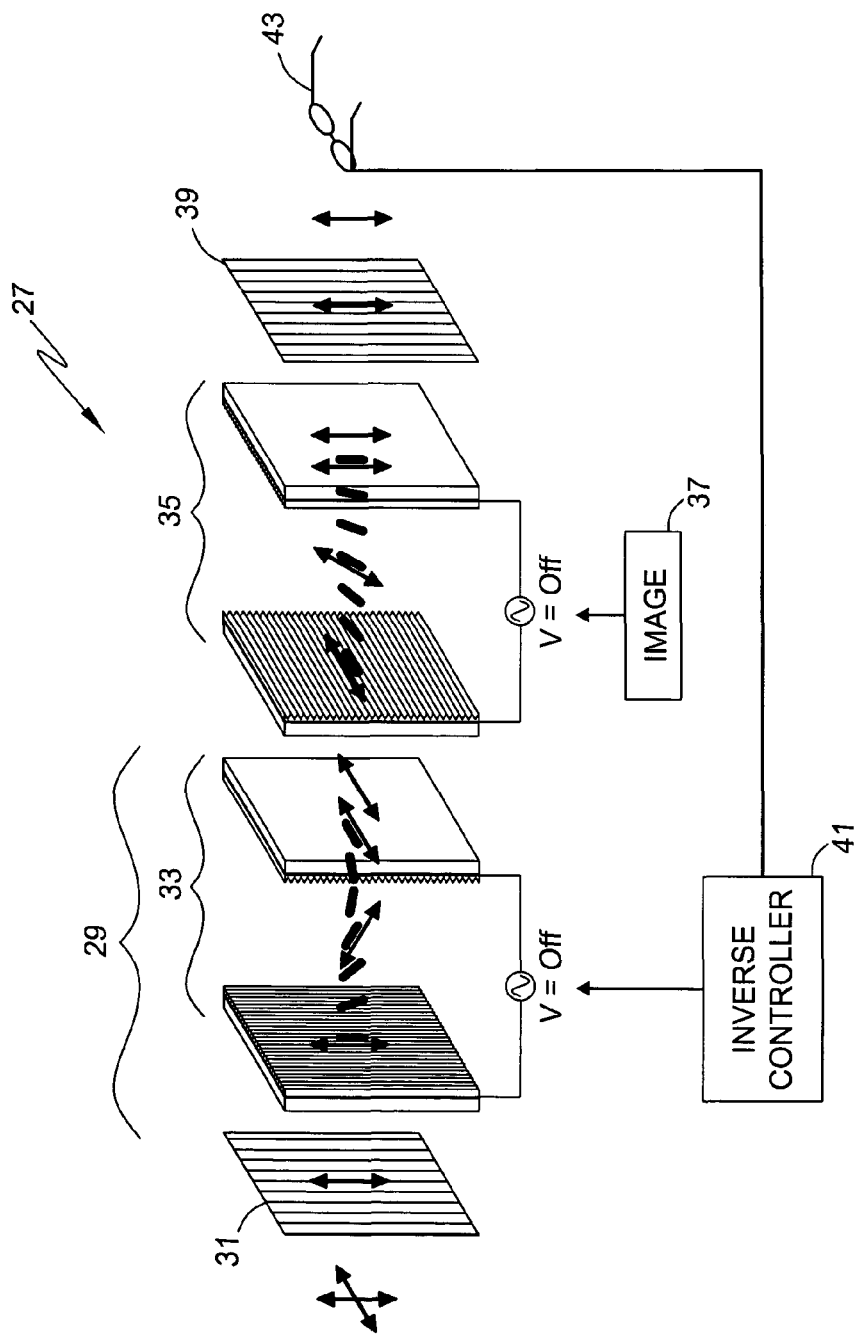
FIG. 5 is an exploded diagrammatical view of a LCD cell constructed in accordance with the present invention, including a rear variable polarizer for providing independent auto-inversion of the fundamental image produced thereby.

If an LCD can be rapidly switched between polarization states, the original positive image can be rapidly alternated with its negative or inverse image. If switched fast enough, to anyone viewing the display, the perceived resulting image will be a 50% gray, substantially featureless image. Thus, in the present invention, as shown in FIG. 5, in order to provide for a confidential display 27, a variable polarizer 29 is used in place of either the front or the rear linear polarizer of an LCD. While it is contemplated that the variable polarizer 29 may take on any configuration to cause the desired variance in optical rotation, this variable polarizer 29 may be constructed of a fixed linear polarizer 31 in combination with an additional liquid crystal rotator layer 33. FIG. 5 illustrates a display configuration wherein the variable polarizer 29 replaces the rear polarizer 31 of an LCD, and in essence is constructed by adding an additional liquid crystal rotator 33 between the fixed linear rear polarizer 31 and the LCD's display rotator cell 35 which receives the image signal 37. Utilizing the variable polarizer 29 in place of the front linear polarizer 39 simply involves reversing the position of optical rotator 33 with that of display rotator cell 35.

The optical rotators 33 and 35 may be of similar construction to rotator 5 described in connection with the conventional LCD shown in FIGS. 1-3, and therefore will not be repeated. Since the optical rotator layer 33 needs only rotate the light either 0 or 90 degrees, however, it can be optimized for independent bi-state operation (such as a Pi cell) by utilizing inverse controller 41. This provides the capability for rapid switching of states completely independent of, and much faster than, the established refresh rate of the display itself. If, as shown in FIG. 5, the added optical rotator 33 is inserted between the rear linear polarizer 31 and the display rotator cell 35, the display 27 can operate in either the positive or negative mode by simply switching the applied voltage to the rear liquid crystal rotator 33. This is shown in the positive mode in FIG. 5, and in the negative mode in FIG. 6. If switched rapidly between states, the original positive or fundamental image is now rapidly alternated with its negative or inverse image. If switched fast enough, the perceived resulting combined image is a 50% gray, substantially featureless image. If desired, inverse controller 41 may periodically or randomly alternate the applied voltage to liquid crystal rotator 33, thereby causing periodic or random alternation between the fundamental and inverse image, provided an approximate 50% duty cycle is maintained therebetween. This provides a means for completely confidential viewing.

To someone wearing synchronized eyewear 43, the fundamental image may be easily extracted. Shutter glasses 43, similar to those used in common 3D stereo viewing applications, may be used to extract the fundamental image from the combined. The glasses 43, which are also controlled by inverse controller 41 and synchronized with the rear variable rotator 33, are configured so that their shutters are open only when the positive fundamental image is displayed, and closed when the negative inverted image is displayed. In this way, only the positive or fundamental image is viewed, and the negative or inverted image is blocked. If the front polarizer 39 is replaced with the same variable polarizer 29 instead of the rear, the confidential viewing is identical. However, as previously stated, in this case the variable rotator 29 is placed between the display rotator cell 35 and the front linear polarizer 39. The extraction is the same as in the case of the use of a rear variable polarizer.

Figure 6:
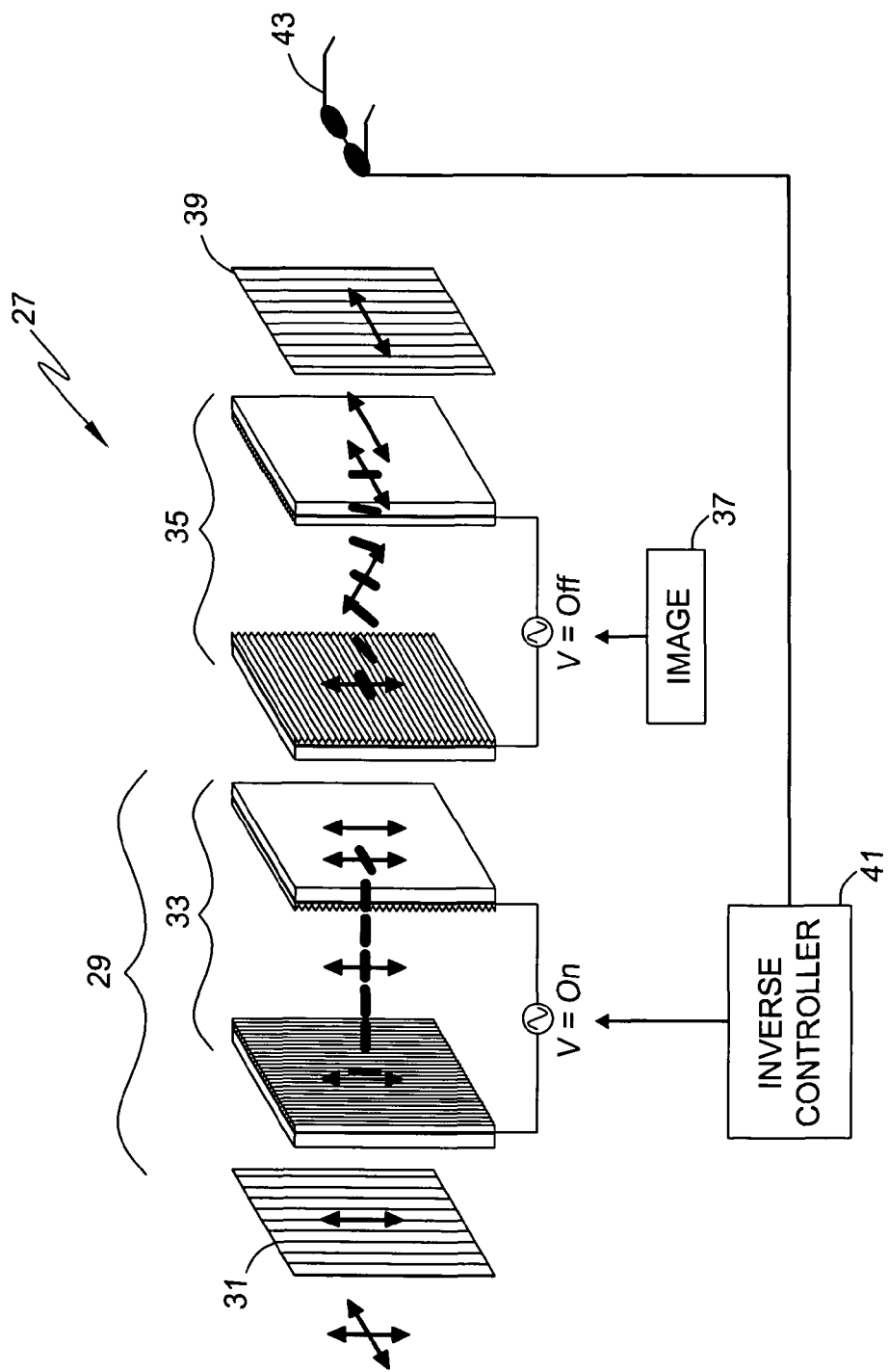
FIG. 6 is an exploded diagrammatical view of the LCD cell shown in FIG. 5, showing the auto-inversion effect of the fundamental image caused by applying an inverting voltage to the liquid crystal layer of the rear variable polarizer.

Regardless of which configuration is used, either front or rear, if an additional variable optical rotator 47 is used after the front linear polarizer 39, the manner of required image extraction may be altered, and under certain circumstances made more secure. This is shown for a rear variable polarizer configuration 45 in FIG. 7, wherein like reference numerals are utilized to designate the same or similar elements as shown in FIGS. 5 and 6. As shown, the combination of the LCD's front linear polarizer 39 and the additional variable optical rotator 47 essentially produces another variable polarizer 49, which is also controlled by inverse controller 41. In this implementation, as the angle of the first or rear variable polarizer 29 is alternated between orthogonal states to generate a substantially featureless image, so is the angle of the second variable polarizer 49 to alter the polarization of the output image. Altering the state of polarization of polarizers 29 and 49 is accomplished by switching the applied voltage (i.e., "ON" versus "OFF") to optical rotators 33 and 47, respectively.

Figure 7:
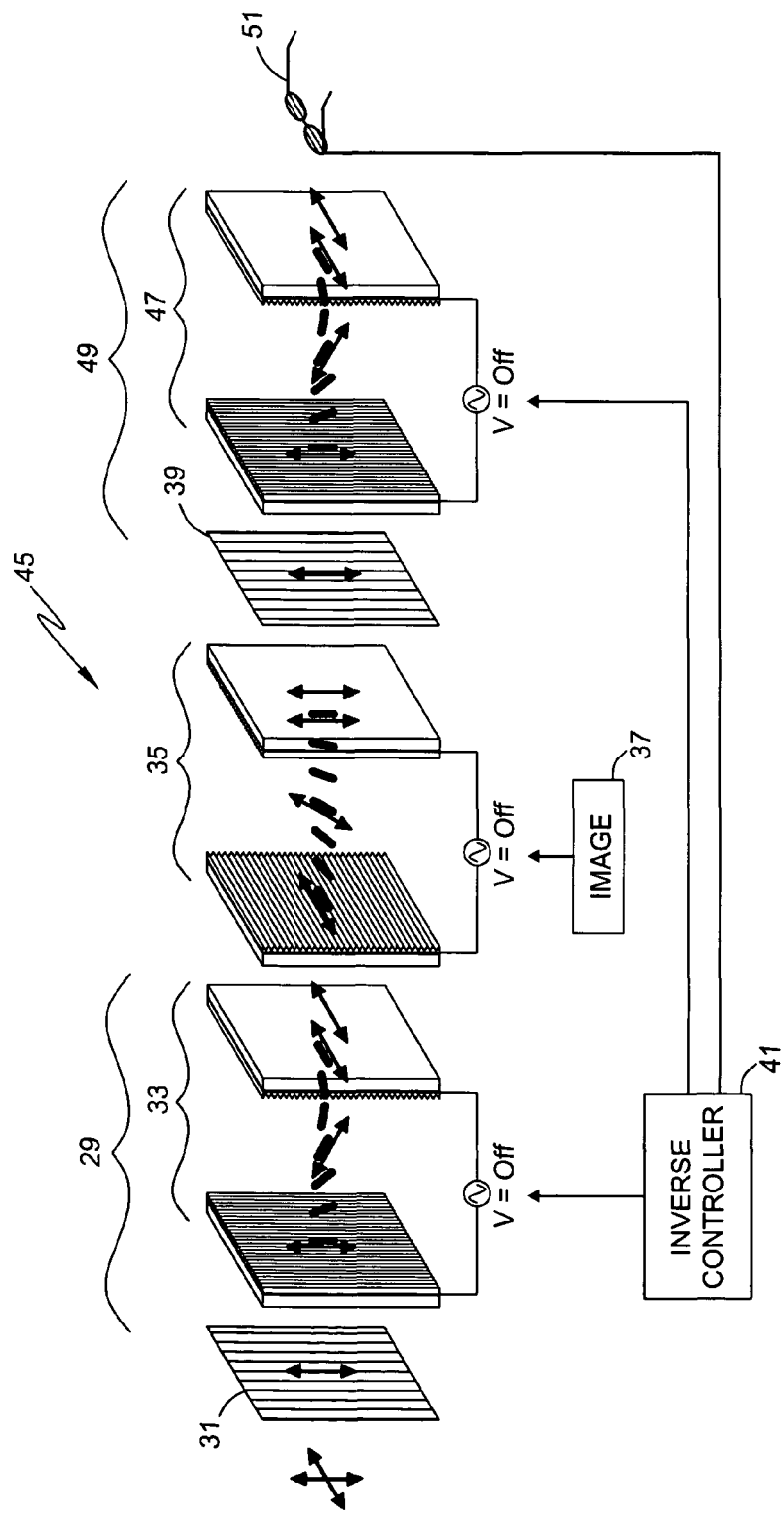
FIG. 7 is an exploded diagrammatical view of an alternative embodiment of a LCD cell constructed in accordance with the present invention, including both rear and front variable polarizers for providing independent auto-inversion of the fundamental image produced thereby.

If, as shown in FIG. 7, variable polarizers 29 and 49 alternate in synchronization between common states of polarization, ordinary linearly polarized eyewear may be utilized to block the inverted image and view only the positive fundamental image, as the fundamental image will always be of one polarization state while the inverse is of the other. If variable polarizers 29 and 49 are operated in synchronization but always out of phase (i.e., orthogonally polarized), the polarization vector of the fundamental image will now be orthogonal to that previously described, and linearly polarized eyewear may still be utilized to view the desired fundamental image. For example, if the fundamental image was previously viewed as a horizontally polarized image (FIG. 7), it will now be viewed as a vertically polarized image.

If, on the other hand, variable polarizers 29 and 49 operate in synchronization, but periodically or randomly out of phase with one another, the desired fundamental image becomes impossible to view using passive polarized lenses. In this case, synchronized variable polarizing eyewear 51 is now required to view the fundamental image. These may be constructed in like manner utilizing a liquid crystal rotator followed by a linear polarizer. Through inverse controller 41, eyewear 51 may then be synchronized to the relative phase relationship between variable polarizers 29 and 49 so as to alter polarization state as necessary to extract only the fundamental image, regardless of polarization orientation. This implementation has the advantage of being able to operate in two different secure modes, one with lightweight passively polarized eyewear, and the other more secure mode utilizing synchronized variable polarizing eyewear 51.

A similar effect can be obtained by combining the embodiment of FIGS. 5 and 6 with a micro polarizing overlay (not shown). For example, if the front linear polarizer were replaced with a checkerboard array of orthogonally arranged polarizers, half of the pixels would be in their fundamental state, while the other half would always be in their inverted state. When the variable polarizer switches state, all of the pixels would reverse their states. In this way, at any time half of the pixels are always inverted. The same synchronized variable polarizing eyewear may be used to extract the image.

Since these new variable polarizing layers can be operated much faster than the LCD display, flicker is completely eliminated, and in fact, the mechanism that causes flicker has been completely removed when utilizing variable polarizing eyewear instead of shutter glasses. In addition, the original image data is unchanged; only the viewable image itself has been altered, so no additional image processing is necessary. This new display may be operated in either normal or secure modes, and is easily switched by keystrokes or mouse commands, without any physical alteration of the display required.

It will, of course, be understood that various changes may be made in the form, details, arrangement and proportions of the parts without departing from the scope of the invention which comprises the matter shown and described herein and set forth in the appended claims.

The invention claimed is:

1. A display apparatus for displaying an image only to an intended viewer, comprising:
   a. a display device having first and second polarizing light filters between which first and second optical rotators are disposed, said display device being configured to display an image thereon;
   b. an inverse controller connected to said second optical rotator to cause said second optical rotator to alternate in time the orientation of light passing therethrough between substantially orthogonal positions, thereby producing a combined substantially featureless image on said display which is indecipherable to the naked eye and composed of components of said image and an inverted image thereof;
   c. an image decoder synchronized with said display device to extract said image to be viewed from said substantially featureless image for viewing only by the intended viewer.

2. The display apparatus of claim 1, wherein said display device is constructed to be capable of being electronically switched between a secure viewing mode and a non-secure viewing mode.

3. The display apparatus of claim 1, wherein said second alternating optical rotator is configured for independent operation relative to said display device.

4. The display apparatus of claim 1, wherein said first and second optical rotators are comprised of a pair of adjacently disposed liquid crystal devices.

5. The display apparatus of claim 1, wherein said display device is an electronic display having a periodic display refresh rate, and said second optical rotator is configured to alternate light passing therethrough between orthogonal orientations independently of said display at a speed exceeding that of said display refresh rate.

6. The display apparatus of claim 1, wherein said image decoder is comprised of an optical shutter device.

7. The display apparatus of claim 1, wherein said image decoder is synchronized with said second optical rotator to extract said image to be viewed from said substantially featureless image for viewing only by the intended viewer.

8. The display apparatus of claim 7, wherein said second optical rotator is configured to randomly alternate the orientation of light passing therethrough between substantially orthogonal positions.

9. The display apparatus of claim 1, including a third optical rotator disposed between said display device and said image decoder, said third optical rotator being configured to alternate the orientation of light passing therethrough between substantially orthogonal positions.

10. The display apparatus of claim 9, wherein said third optical rotator alternates the orientation of light passing therethrough in synchrony with said second optical rotator to configure the polarization angle of said image components differently than that of said inverted image.

11. The display apparatus of claim 9, wherein the phase relationship between the orientation of light passing through said third optical rotator and said second optical rotator is varied over time.

12. The display apparatus of claim 11, wherein said image decoder is comprised of a variable polarizer synchronized with said second and third optical rotators for viewing only the components of said image to be viewed.

* * * * *